US010419280B2

United States Patent
Liu

(10) Patent No.: US 10,419,280 B2
(45) Date of Patent: Sep. 17, 2019

(54) METHODS AND APPARATUS FOR SWITCHING BETWEEN A WIRED COMMUNICATION AND A WIRELESS COMMUNICATION

(71) Applicant: BEIJING ZHIGU TECH CO., LTD., Beijing (CN)

(72) Inventor: Jia Liu, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 59 days.

(21) Appl. No.: 15/505,309

(22) PCT Filed: Aug. 26, 2015

(86) PCT No.: PCT/CN2015/088089
§ 371 (c)(1),
(2) Date: Feb. 21, 2017

(87) PCT Pub. No.: WO2016/029847
PCT Pub. Date: Mar. 3, 2016

(65) Prior Publication Data
US 2017/0272314 A1    Sep. 21, 2017

(30) Foreign Application Priority Data
Aug. 26, 2014  (CN) .......................... 2014 1 0426125

(51) Int. Cl.
*H04L 12/24* (2006.01)
*H04W 76/14* (2018.01)
(Continued)

(52) U.S. Cl.
CPC ........... *H04L 41/0803* (2013.01); *H04W 4/80* (2018.02); *H04W 8/005* (2013.01); *H04W 36/00* (2013.01); *H04W 76/10* (2018.02); *H04W 76/14* (2018.02)

(58) Field of Classification Search
None
See application file for complete search history.

(56) References Cited

U.S. PATENT DOCUMENTS

| 8,018,834 B2 * | 9/2011 | Mantysalo | .......... H04M 1/6058 370/210 |
| 2006/0111097 A1 * | 5/2006 | Fujii | .................. H04L 63/08 455/420 |
| 2007/0036358 A1 * | 2/2007 | Nguyen | .............. H04L 41/0806 380/270 |

FOREIGN PATENT DOCUMENTS

| CN | 1654104 A | 8/2005 |
| CN | 101707495 A | 5/2010 |

(Continued)

OTHER PUBLICATIONS

International Search Report and Written Opinion for Application No. PCT/CN2015/088089, dated Nov. 25, 2015, 7 pages.

*Primary Examiner* — Anh Ngoc M Nguyen
(74) *Attorney, Agent, or Firm* — Sheppard Mullin Richter & Hampton LLP

(57) ABSTRACT

Embodiments of the subject application provide a wireless communication method and a wireless communication apparatus. The method comprises: determining information associated with a wired connection between a first device and a second device; and generating a wireless communication configuration parameter according to the information associated with the wired connection and a wireless communication specification associated with a wireless communication to be performed by the first device and the second device, wherein, in response to that the disconnection of the wired connection, wherein the wireless communication parameter enables first device and the second device to perform the wireless communication according to the wireless communications configuration parameter. The method (Continued)

and apparatus of embodiments of the subject application generate a wireless communication configuration parameter for wireless communication according to information associated with a wired connection, thereby enabling switching between a wired communications and a wireless communication manner quickly and in a secure manner.

18 Claims, 4 Drawing Sheets

(51) Int. Cl.
*H04W 36/00* (2009.01)
*H04W 8/00* (2009.01)
*H04W 4/80* (2018.01)
*H04W 76/10* (2018.01)

(56) References Cited

FOREIGN PATENT DOCUMENTS

| | | |
|---|---|---|
| CN | 201663589 U | 12/2010 |
| CN | 102143536 B | 8/2011 |
| CN | 103533141 A | 1/2014 |
| CN | 104159259 A | 11/2014 |
| CN | 104683248 A | 6/2015 |
| EP | 2134112 A1 | 12/2009 |
| JP | 2014-116848 A | 6/2014 |
| KR | 20050059800 A | 6/2005 |

\* cited by examiner

METHODS AND APPARATUS FOR SWITCHING BETWEEN A WIRED COMMUNICATION AND A WIRELESS COMMUNICATION

RELATED APPLICATION

This application is a 371 National Phase of International Patent Application No. PCT/CN2015/088089, filed on Aug. 26, 2015, which claims priority to Chinese Patent Application No. 201410426125.0, filed with the Chinese Patent Office on Aug. 26, 2014 and entitled "WIRELESS COMMUNICATION METHOD AND WIRELESS COMMUNICATION APPARATUS", each of which is incorporated herein by reference in its entirety.

TECHNICAL FIELD

The subject application relates to the field of wireless communication technologies, and in particular, to methods and apparatuses for switching between a wired communication to a wireless communication.

BACKGROUND

Generally, there are two ways of communications between devices: communications in a wired way through a wired connection, such as USB, Ethernet and the like, and communications in a wireless way through a wireless connection, such as WiFi, Bluetooth and the like. The wired way is generally used to transmit a large amount of data since small interference and large bandwidth, etc. The wireless way is also widely applied since high mobility and broad coverage, etc. During communications between devices through the wired connection, the wired connection may be disconnected due to some reasons, and in this case, the communications may be switched to a wireless connection to maintain the communications. In the scenario of switching between wired connection and wireless connection, such problem may exist: there may be multiple wireless devices available for connection around. Therefore, a solution capable of rapidly determining an object with which to establish a wireless connection and performing wireless communication is in urgently need.

SUMMARY

A technical problem to be solved by the various embodiments is to provide methods and apparatuses that facilitate establishment of a wireless communication between multiple devices that are previously connected via a wired connection, after a disconnection of the wired connection.

In a first aspect, an embodiment of the subject application provides a wireless communication method, which comprises:

determining information associated with a wired connection between a first device and a second device; and generating a wireless communication configuration parameter according to the information associated with the wired connection and a wireless communication specification associated with a wireless communication to be performed by the first device and the second device, wherein the wireless communication parameter enables first device and the second device to perform the wireless communication according to the wireless communication configuration parameter.

In a second aspect, an embodiment of the subject application provides a wireless communication method, which comprises:

generating a wireless communication configuration parameter according to information associated with a wired connection with a first device and a wireless communication specification associated with a wireless communication to be performed with the first device; and in response to a disconnection of the wired connection, performing wireless communication with the first device according to the wireless communication configuration parameter.

In a third aspect, an embodiment of the subject application provides a wireless communication apparatus, which comprises:

a first determining module, configured to determine information associated with a wired connection between a first device and a second device; and a generating module, configured to generate a wireless communication configuration parameter according to the information associated with the wired connection and a wireless communication specification for the wireless communication to be performed by the first device and the second device, wherein the wireless communication parameter enables first device and the second device to perform the wireless communication according to the wireless communication configuration parameter.

In a fourth aspect, an embodiment of the subject application provides a wireless communication apparatus is provided, which comprises:

a generating module, configured to generate a wireless communication configuration parameter according to information associated with a wired connection with a first device and a wireless communication specification associated with the wireless communication to be performed by the first device; and a wireless communication module, configured to: in response to that the disconnection of the wired connection is disconnected, perform wireless communication with the first device according to the wireless communication configuration parameter.

In a fifth aspect of the subject application, a computer readable storage device is provided, comprising at least one executable instruction, which, in response to execution, causes a system comprising a processor to perform operations, comprising:

determining information associated with a wired connection between a first device and a second device; and generating a wireless communication configuration parameter according to the information associated with the wired connection and a wireless communication specification for the wireless communication to be performed by the first device and the second device, wherein the wireless communication parameter enables first device and the second device to perform the wireless communication according to the wireless communications configuration parameter.

In a sixth aspect, an embodiment of the subject application provides a device for wireless communication, which comprises a processor and a memory, wherein the memory storing a computer executable instruction, the processor being connected with the memory via a communication bus, and when the device is operating, the processor executes or facilitates execution of the executable instructions stored by the memory to cause the device to perform operations, the operations comprising:

determining information associated with a wired connection between a first device and a second device; and generating a wireless communication configuration parameter according to the information associated with the wired connection and a wireless communication specification associated with a wireless communication to be performed by the first device and the second device, wherein the wireless communication parameter enables first device and the second device to perform the wireless communication according to the wireless communications configuration parameter.

In a seventh aspect, an embodiment of the subject application provides a non-transitory computer readable storage device, which comprises at least one executable instruction, which, in response to execution, causes a system comprising a processor to perform operations, the operations comprising:

generating a wireless communication configuration parameter according to information associated with a wired connection with a first device and a wireless communication specification associated with a wireless communication to be performed with the first device; and in response to the disconnection of the wired connection, performing wireless communication with the first device according to the wireless communication configuration parameter.

In an eighth aspect, an embodiment of the subject application provides a device for wireless communication, which comprises a processor and a memory, wherein the memory storing a computer executable instruction, the processor being connected with the memory via a communication bus, and when the device is operating, the processor executes or facilitates execution of the executable instructions stored by the memory to cause the device to perform operations, the operations comprising:

generating a wireless communication configuration parameter according to information associated with a wired connection of a first device and a wireless communication specification for the wireless communication to be performed by the first device; and in response to a disconnection of the wired connection, performing wireless communication with the first device according to the wireless communication configuration parameter.

For a method and apparatus of embodiments of the subject application, a wireless communication configuration parameter for wireless communication can be generated according to information associated with a wired connection, to implement switching between a wired communications and a wireless communication quickly and in a secure manner.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
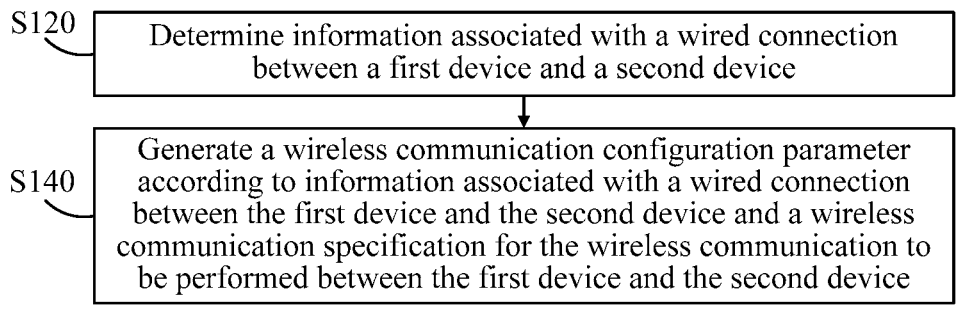
FIG. 1 is an example flow chart of a wireless communication method according to an embodiment of the subject application.

Methods and apparatuses of various embodiments of the subject application are further described in detail through the accompanying drawings (the same reference numerals in several accompanying drawings indicate the same elements) and embodiments. The following embodiments are used to describe the subject application, but are not intended to limit the scope of the subject application.

Persons skilled in the art should understand that terms such as "first" and "second" in the subject application are merely used to distinguish different steps, devices, modules or the like, and the terms neither represent any specific technical meanings nor indicate necessary logic orders of them.

A wireless communication method according to a first embodiment of the subject application may be executed by using an apparatus independent to devices at both parties of wired communications. As shown in FIG. 1, the wireless communication method according to the first embodiment of the subject application comprises:

S120: Determine information associated with a wired connection between a first device and a second device.

In embodiments of the subject application, a first device and a second device are any devices that can perform communications between the two through a wired and wireless connection, for example, a terminal device (a mobile phone, a computer, an earphone, a display, and the like), a network access device (a router, a switch, a repeater, and the like), and a wireless energy transmitting device. The communications may refer to communications including a single input/output party, such as a charging process, and an output process of an audio/video signal, and may also refer to an interactive communications process, such as transmission of a data packet.

According to a role of the apparatus executing a method of this embodiment, in step S120, the information associated with the wired connection may be received from the first device and/or second device. The information associated with the wired connection may be any information involved in the communications process through a wired connection, for example, may comprise at least one of the followings: identification information (for example, MAC addresses of the both parties within the duration of the wired connection) of the first device and the second device, a data transmission rate/amount within the duration of the wired connection for a preset time point/period, information (comprising: a data type, a data size, a file name, and the like) associated with transmitted data within the duration of the wired connection, a disconnection time of the wired connection, and the like.

S140: Generate a wireless communication configuration parameter according to information associated with a wired connection between the first device and the second device and a wireless communication specification for the wireless communication to be performed between the first device and the second device.

In a method of this embodiment, the wireless communication configuration parameter is such a parameter that the first device and the second device may perform wireless communication according to it when the wired connection is disconnected. Moreover, the wireless communication configuration parameter may further comprise an encryption algorithm that may be used in the wireless communication, and the like.

Generally, when the wired connection is disconnected to switch to a wireless connection, a communications object can be determined and authenticated by using processes such as device discovery and authentication; moreover, both parties may negotiate parameters during the wireless communication, such as the wireless communication configuration parameter in the embodiments of the subject application, so as to finally establish the wireless connection and perform data transmission. Additional operation steps of a user would be added in case of there are multiple devices available for wireless connection, thereby increasing the time of establishing the connection. In a method of this embodiment, the wireless communication configuration parameter for the wireless communication can be generated according to the information associated with the wired connection, and the processes such as device discovery and authentication can be reduced, to cause the wireless communication to be implemented quickly. Moreover, the information associated with the wired connection is known to the first device and the second device only, and therefore, switching between wired communications and wireless communication can be implemented in a secure manner.

It should be noted that, the wireless communication configuration parameter can differ according to different protocols (that is, wireless communication specifications) for the wireless communication performed by the first device and the second device, and the wireless communication specifications comprise, but not limited to: WiFi, Bluetooth, Bluetooth Low Energy (BLE), Zigbee, and near field communication (NFC). For example, when the wireless communication specification followed is WiFi, the wireless communication configuration parameter may comprise: a rate of the wireless communication, a channel of the wireless communication, an encryption algorithm used during the wireless communication, and the like. When the wireless communication specification is the Bluetooth Low Energy (BLE), the wireless communication configuration parameter may comprise: a waiting time before being ready for receiving a first connection event, an interval of connection events (connInterval), a channel frequency hopping pattern, a frequency hopping increment, and the like.

In some embodiments, in order to not increase device burden, in S140, the wireless communication configuration parameter may be generated in response to the disconnection of the wired connection.

Moreover, a method of this embodiment can further comprise:

S110: Determine a rule of generating the wireless communication configuration parameter according to the information associated with the wired connection and the wireless communication specification.

The rule may be a pre-negotiated rule, for example, it may have been set during production of the device. In some embodiments, because of some of the features offered by wired connection, such as small interference, large bandwidth and high privacy security, the rule may be negotiated during the communications between the first device and the second device through a wired connection, and in step S110, the rule may be received from the first device and/or second device. Moreover, the rule may also be set randomly according to a specific situation of the wireless communication configuration parameter.

Moreover, when a method of this embodiment is executed by an apparatus independent from the first device and the second device, the method further comprises:

S160: Send the wireless communication configuration parameter.

According to requirements, the wireless communication configuration parameter is sent to the first device and/or second device, to cause the first device and second device perform wireless communication following the wireless communication configuration parameter.

In view of the above, in a method of this embodiment, the wireless communication configuration parameter for the wireless communication is generated according to the information associated with the wired connection, and the wireless connection can be established quickly and in a secure manner.

Figure 2:
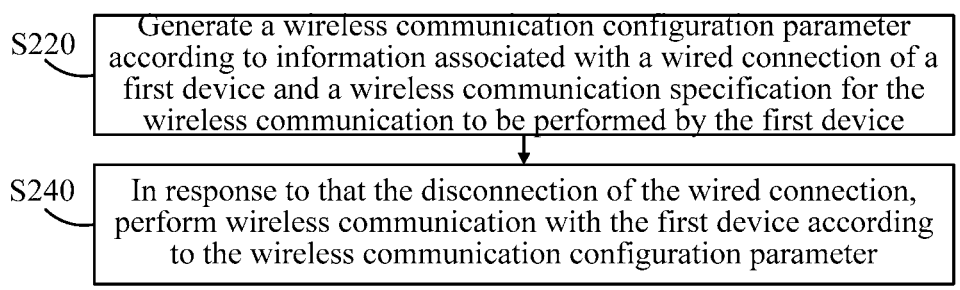
FIG. 2 is an example flow chart of a wireless communication method according to an embodiment of the subject application.

A method of the foregoing embodiment may be executed in an apparatus independent from devices of both parties of the wireless communication, the subject application further provides a wireless communication method of another embodiment, and the method may be executed by any party in the wireless communication process. As shown in FIG. 2, the method comprises:

S220: Generate a wireless communication configuration parameter according to information associated with a wired connection of a first device and a wireless communication specification for the wireless communication to be performed by the first device.

The information associated with the wired connection may be any information involved in the communications process in a wired connection manner, for example, may comprise at least one of the followings: identification information (for example, MAC addresses of the both parties in the process of wired connection) of the first device and the second device, a data transmission rate/amount within the duration of the wired connection for a preset time point/period, related information (comprising: a data type, a data size, a file name, and the like) associated with transmitted data within the duration of the wired connection, a disconnection time of the wired connection, and the like.

In a method of this embodiment, the wireless communication configuration parameter is such a parameter that the first device and the second device may perform wireless communication according to it when the wired connection is disconnected.

S240: In response to that the disconnection of the wired connection, perform wireless communication with the first device according to the wireless communication configuration parameter.

Generally, when the wired connection is disconnected and especially when there are multiple devices available for wireless connection, a wireless connection may need to be established by processes such as device discovery and authentication, and after the wireless connection is established, both parties negotiate parameters during the wireless communication, such as the wireless communication configuration parameter in the embodiments of the subject application. In a method of this embodiment, the wireless communication configuration parameter for the wireless communication can be generated according to the wired connection, and the processes such as device discovery and authentication are reduced, to cause the wireless communication to be implemented quickly. Moreover, the information associated with the process having the wired connection is known to the first device and the second device only, and therefore, switching between wired communications and wireless communication can be implemented in a secure manner.

It should be noted that, the wireless communication configuration parameter can differ according to different protocols (that is, wireless communication specifications) for the wireless communication performed by the first device, and the wireless communication specifications comprise, but not limited to: WiFi, Bluetooth, BLE, Zigbee, and NFC. For example, when the wireless communication specification is WiFi, the wireless communication configuration parameter may comprise: a rate of the wireless communication, a channel of the wireless communication, an encryption algorithm used during the wireless communication, and the like. When the wireless communication specification is the BLE, the wireless communication configuration parameter may comprise: a waiting time before being ready for receiving a first connection event, an interval of connection events, a channel frequency hopping pattern, a frequency hopping increment, and the like.

In some embodiments, in order to not increase device burden, in S240, the wireless communication configuration parameter may be generated in response to the disconnection of the wired connection.

Moreover, to implement a method of this embodiment, the rule for generating the wireless communication configuration parameter according to the information associated with the wired connection and the wireless communication specification may be negotiated with the first device. Correspondingly, a method of this embodiment further comprises:

S210: Determine a rule of generating the wireless communication configuration parameter according to the information associated with the wired connection and the wireless communication specification.

The rule may be a conventional rule, for example, it may have been set during production of the device. In some embodiments, because the features offered by wired connection, such as small interference, large bandwidth and high privacy security, in step S210, the determination of the rule may be performed in the process of communications with the first device through a wired connection. Moreover, the rule may also be set randomly according to a specific situation of the wireless communication configuration parameter.

In view of the above, in a method of this embodiment, the wireless communication configuration parameter for the wireless communication is generated according to the information associated with the wired connection, and the wireless connection can be established quickly and in a secure manner.

A person skilled in the art should understand that in the above methods of the subject application, serial numbers of steps do not indicate priorities of execution sequences, the execution sequences of the steps should be determined according to functions and inner logic thereof, and should not constitute a limitation to the above methods of the subject application.

In addition, an embodiment of the subject application further provides a computer readable medium, comprising computer readable instructions for performing the following operations when being executed: executing operations of the steps in the method in the implementation manner shown in FIG. 1.

An embodiment of the subject application further provides a computer readable medium, comprising computer readable instructions for performing the following operations when being executed: executing operations of the steps in the method in the implementation manner shown in FIG. 2.

Figure 3:
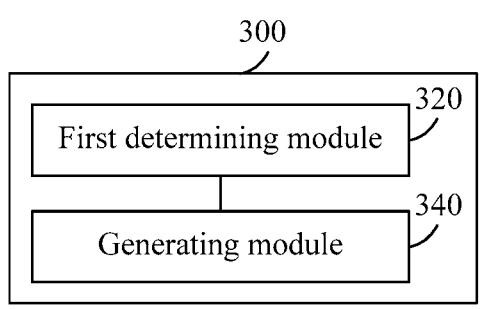
FIG. 3 is an example structural block diagram of a wireless communication apparatus according to an embodiment of the subject application.

A wireless communication apparatus according to a first embodiment of the subject application may be an apparatus independent from devices of both parties of wired communications, and correspondingly, the apparatus comprises corresponding modules configured to communicate with the devices of the wired communication, which are not repeated herein. As shown in FIG. 3, a wireless communication apparatus 300 according to the first embodiment of the subject application comprises:

a first determining module 320, configured to determine information associated with a wired connection between a first device and a second device.

The information associated with the wired connection may be any information involved in the communications process through a wired connection, for example, may comprise at least one of the followings: identification information (for example, MAC addresses of the both parties within the duration of the wired connection) of the first device and the second device, a data transmission rate/amount within the duration of the wired connection for a preset time point/period, information (comprising: a data type, a data size, a file name, and the like) associated with transmitted data in the wired connection process, a disconnection time of the wired connection, and the like. The first determining module 320 may receive the information associated with the wired connection from the first device and/or second device by using a communications module.

A generating module 340, configured to generate a wireless communication configuration parameter according to information associated with a wired connection between the first device and the second device and a wireless communication specification for the wireless communication to be performed between the first device and the second device.

In an apparatus of this embodiment, the wireless communication configuration parameter is such a parameter that the first device and the second device may perform wireless communication according to it when the wired connection is disconnected. Moreover, the wireless communication configuration parameter may further comprise an encryption algorithm of the wireless communication, and the like.

Generally, when the wired connection is disconnected and especially when there are multiple devices available for wireless connection, a communications object can be determined and authenticated by using processes such as device discovery and authentication; moreover, both parties can also negotiate parameters during the wireless communication, such as the wireless communication configuration parameter in the embodiments of the subject application, so as to finally establish the wireless connection and perform data transmission. Additional operation steps of a user would be added in case of there are multiple devices available for wireless connection, thereby increasing the time of establishing the connection. In a method of this embodiment, the wireless communication configuration parameter for the wireless communication is generated according to the information associated with the wired connection, and the processes such as device discovery and authentication are reduced, to cause the wireless communication to be implemented quickly. Moreover, the information associated with the wired connection is merely known to the first device and the second device, and therefore, switching between wired communications and wireless communication can be implemented in a secure manner.

It should be noted that, the wireless communication configuration parameter differs according to different protocols (that is, wireless communication specifications) for the wireless communication performed between the first device and the second device, and the wireless communication specifications comprise, but not limited to: WiFi, Bluetooth, Bluetooth Low Energy (BLE), Zigbee, and near field communication (NFC). For example, when the wireless communication specification is WiFi, the wireless communication configuration parameter may comprise: a rate of the wireless communication, a channel of the wireless communication, an encryption algorithm used by the wireless communication, and the like. When the wireless communication specification is the Bluetooth Low Energy (BLE), the wireless communication configuration parameter may comprise: a waiting time before being ready for receiving a first connection event, an interval of connection events (connInterval), a channel frequency hopping pattern, a frequency hopping increment, and the like.

In some embodiments, in order to not increase device burden, the generating module 340 may generate the wireless communication configuration parameter in response to the disconnection of the wired connection.

Figure 4:
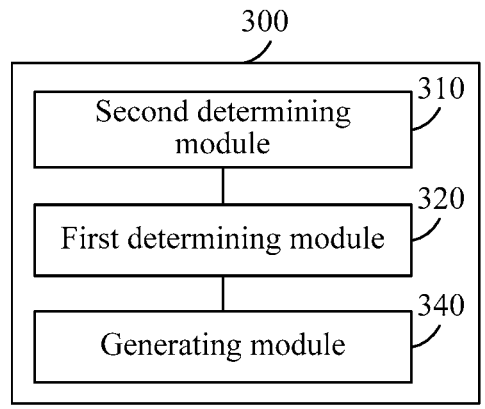
FIG. 4 is an example structural block diagram of a wireless communication apparatus according to an embodiment of the subject application.

In some embodiments, as shown in FIG. 4, the apparatus 300 of this embodiment may further comprise:

a second determining module 310, configured to determine a rule of generating the wireless communication configuration parameter according to the information associated with the wired connection and the wireless communication specification.

The rule may be a pre-negotiated rule, for example, it may have been set during a production of the device. In some embodiments, because of the features offered by wired connection, such as small interference, large bandwidth and high privacy security, the rule may be negotiated during the communications between the first device and the second device through a wired connection, and the second determining module 310 may receive the rule from the first device and/or second device by using the communications module. Moreover, the rule may also be set randomly according to a specific situation of the wireless communication configuration parameter.

Figure 5:
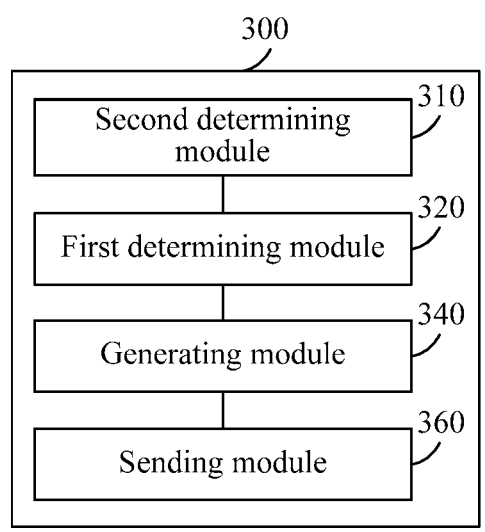
FIG. 5 is an example structural block diagram of a wireless communication apparatus according to an embodiment of the subject application.

In some embodiments, as shown in FIG. 5, the apparatus 300 of this embodiment may further comprise:

a sending module 360, configured to send the wireless communication configuration parameter.

According to requirements, the sending module 360 sends the wireless communication configuration parameter to the first device and/or second device, to cause the first device and second device perform wireless communication according to the wireless communication configuration parameter.

In view of the above, in an apparatus of this embodiment, the wireless communication configuration parameter for the wireless communication is generated according to the information associated with the wired connection, and the wireless connection can be established quickly and in a secure manner.

Figure 6:
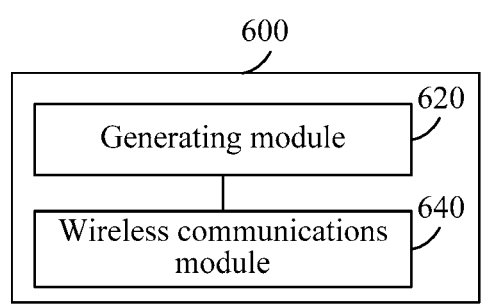
FIG. 6 is an example structural block diagram of a wireless communication apparatus according to an embodiment of the subject application.

An apparatus of the foregoing embodiment may be executed in the apparatus independent to devices of both parties of the wireless communication, the subject application further provides a wireless communication apparatus of another embodiment, and the apparatus may be any party in the wireless communication process. As shown in FIG. 6, the apparatus comprises:

a generating module 620, configured to generate a wireless communication configuration parameter according to information associated with a wired connection of a first device and a wireless communication specification for the wireless communication to be performed by the first device.

The information associated with the wired connection may be any information involved in the communications process in a wired connection manner, for example, may comprise at least one of the followings: identification information (for example, MAC addresses of the both parties in the process of wired connection) of the first device and the second device, a data transmission rate/amount within the duration of the wired connection for a preset time point/period, information (comprising: a data type, a data size, a file name, and the like) associated with transmitted data within the duration of the wired connection process, a disconnection time of the wired connection, and the like.

In an apparatus of this embodiment, the wireless communication configuration parameter is such a parameter that the first device and the second device may perform wireless communication according to it when the wired connection is disconnected.

a wireless communication module 640, configured to: in response to that the wired connection is disconnected, perform wireless communication with the first device according to the wireless communication configuration parameter.

Generally, when the wired connection is disconnected and especially when there are multiple devices available for wireless connection, a communications object needs to be determined and authenticated by using processes such as device discovery and authentication; moreover, both parties further need to negotiate necessary parameters in the wireless communication process, that is, the wireless communication configuration parameter in the embodiments of the subject application, so as to finally establish the wireless connection and perform data transmission. The process will increase operation steps of a user when there are multiple devices available for wireless connection, thereby increasing the time of establishing the connection. In a method of this embodiment, the wireless communication configuration parameter for the wireless communication is generated according to the information associated with the wired connection, and the processes such as device discovery and authentication are reduced, to cause the wireless communication to be implemented quickly. Moreover, the information associated with the process having the wired connection is known to the first device and the second device only, and therefore, switching between wired communications and wireless communication can be implemented in a secure manner. It should be noted that, the wireless communication configuration parameter differs according to different protocols (that is, wireless communication specifications) for the wireless communication performed by the first device, and the wireless communication specifications comprise, but not limited to: WiFi, Bluetooth, BLE, Zigbee, and NFC. For example, when the wireless communication specification is WiFi, the wireless communication configuration parameter may comprise: a rate of the wireless communication, a channel of the wireless communication, an encryption algorithm used by the wireless communication, and the like. When the wireless communication specification is the BLE, the wireless communication configuration parameter may comprise: a waiting time before being ready for receiving a first connection event, an interval of connection events, a channel frequency hopping pattern, a frequency hopping increment, and the like.

In some embodiments, in order to not increase device burden, the wireless communication module 640 may generate the wireless communication configuration parameter in response to that the disconnection of the wired connection.

Figure 7:
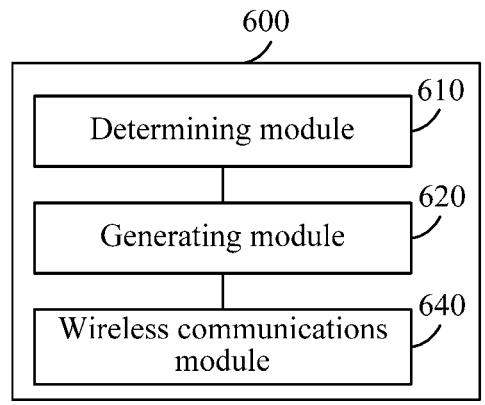
FIG. 7 is an example structural block diagram of a wireless communication apparatus according to an embodiment of the subject application.

In some embodiments, an apparatus of this embodiment may negotiate, with the first device, can generate, based on a rule, wireless communication configuration parameter according to the information associated with the wired connection and the wireless communication specification. Correspondingly, as shown in FIG. 7, the apparatus 600 of this embodiment further comprises:

a determining module 610, configured to determine a rule of generating the wireless communication configuration parameter according to the information associated with the wired connection and the wireless communication specification.

The rule may be a conventional rule, for example, it may have been set during production stage of the device. In some embodiments manner, because the features which wired connection has, such as small interference, large bandwidth and high privacy security, the determining module 610 may determine the rule in the process of communications with the first device through a wired connection. Moreover, the rule may also be set randomly according to a specific situation of the wireless communication configuration parameter.

In view of the above, in an apparatus of this embodiment, the wireless communication configuration parameter for the wireless communication is generated according to the information associated with the wired connection, and the wireless connection can be established quickly and in a secure manner.

The methods and apparatus of the embodiments of the subject application are further described through specific examples.

A device A and a device B are devices with BLE modules and the wireless communication apparatus according to the first embodiment of the subject application respectively. During the communications between the two devices through a wired connection, the wired connection is disconnected. In response to that the disconnection of the wired connection, any device A/B can implement wireless communication according to a method of the first embodiment of the subject application. By using the device A as a master device (a role thereof may be determined according to a data flow direction before the wired connection is disconnected) in a BLE communications process as an example, specifically:

After the wired connection establishment is disconnected, the device A and the device B can generate a wireless communication configuration according to historical information of the wired connection. For example:

| Parameter name | Meaning | Determination rule |
| --- | --- | --- |
| AA (Access Address) | An access address of a connection, and used identify a data link | Generate based on wired connection addresses of both parties, for example, exclusive OR is performed on the two addresses and first 32 bits are captured. |
| CRCInit | CRC initial check | Use a CRC before the wired |

-continued

| Parameter name | Meaning | Determination rule |
| --- | --- | --- |
| | value | connection is disconnected as an initial value |
| WinOffset | Waiting time before being ready for receiving a first connection event | Generate according to a duration time of the wired connection |
| WinSize | Waiting time after being ready for receiving a first connection event | Generate according to a duration time of the wired connection |
| Interval | Interval between connection events (connInterval) | Determine according to data transmission amount of the wired connection |
| ChM (Channel Map) | Channel frequency hopping pattern | Generate by using a disconnection time of the wired connection as a random number seed |
| Hop | Frequency hopping increment | Generate by using a disconnection time of the wired connection as a random number seed |

After a first data packet is received at a wireless interface, it may be considered that a data link has been established. After that, if the parameter determined before is not for a wireless connection, adjustment may be performed by using a connection management command of BLE.

The device A and device B can perform data transmission according to the wireless communication configuration parameter, with or without completing the processes of device discovery and connection establishment. Specifically:

The device A maybe no longer in a broadcast status to send a broadcast packet ADV_IND; and the device B maybe no longer in an initial status to execute an interception operation. Both parties already have a wireless communication configuration parameter to follow, to cause both parties enter a connection status. The chM determines a first data channel value, and sending of a data packet can start after waiting for a WinOffset time.

Moreover, the wireless communication configuration parameter may further comprise a security encryption parameter, which is used in wireless data transmission of the device A and the device B to perform data encryption and decryption. For example, a content attribute (such as a file name) transmitted before the wired connection is disconnected can be used as a Temporary Key or a Long-Term Key to encrypt the link.

Figure 8:
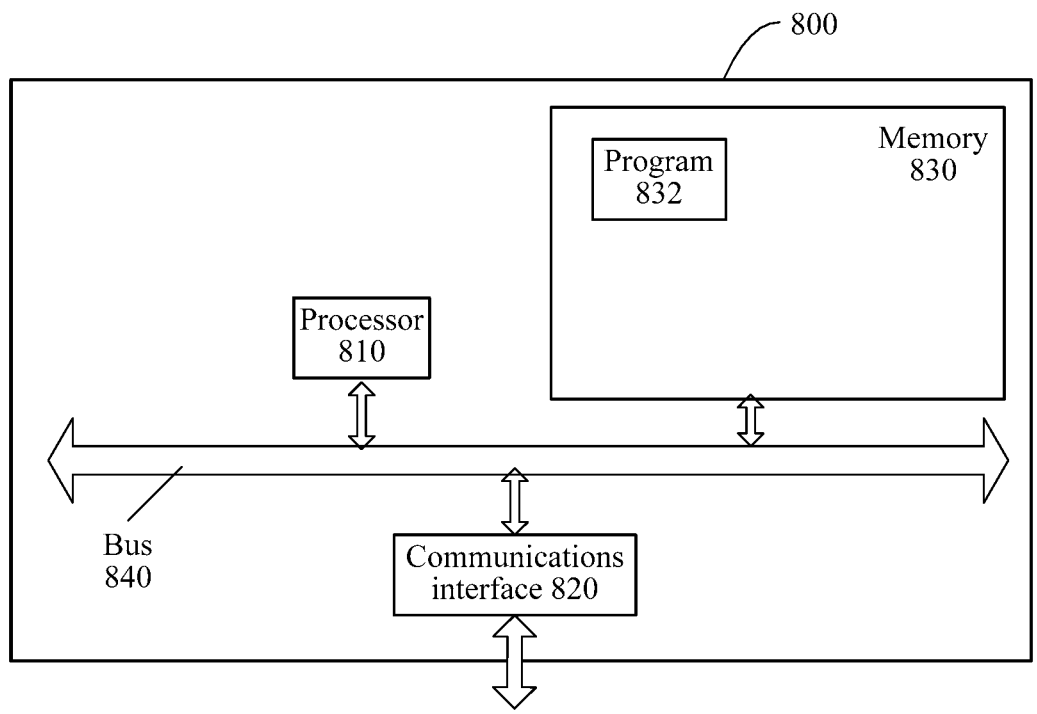
FIG. 8 is an example structural block diagram of a wireless communication apparatus according to an embodiment of the subject application.

FIG. 8 is a schematic structural diagram of a wireless communication apparatus 800 provided in an embodiment of the subject application, and the specific implementation of the wireless communication apparatus 800 is not limited in the specific implementation of the subject application. As shown in FIG. 8, the wireless communication apparatus 800 may comprise:

A processor 810, a communications interface 820, a memory 830, and a communications bus 840, where:

The processor 810, the communications interface 820, and the memory 830 complete mutual communications with each other through the communications bus 840.

The communications interface 820 is configured to communicate with a network element such as a client.

The processor 810 is configured to execute a program 832, and specifically can implement related functions of the wireless communication apparatus in embodiments of, for example, FIGS. 3-7.

Specifically, the program 832 may comprise a program code. The program code comprises a computer operating instruction.

The processor 810 may be a central processing unit CPU or an Application Specific Integrated Circuit (ASIC), or be configured to be one or more integrated circuits configured to implement the embodiments of the subject application. The program 832 may cause the wireless communication apparatus 800 to execute the following steps:

determining information associated with a wired connection between a first device and a second device; and generating a wireless communication configuration parameter according to the information associated with the wired connection and a wireless communication specification for the wireless communication to be performed by the first device and the second device, wherein, in response to the disconnection of the wired connection, the first device and the second device perform the wireless communication according to the wireless communication configuration parameter.

Specific implementations of all steps in the program 832 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

Figure 9:
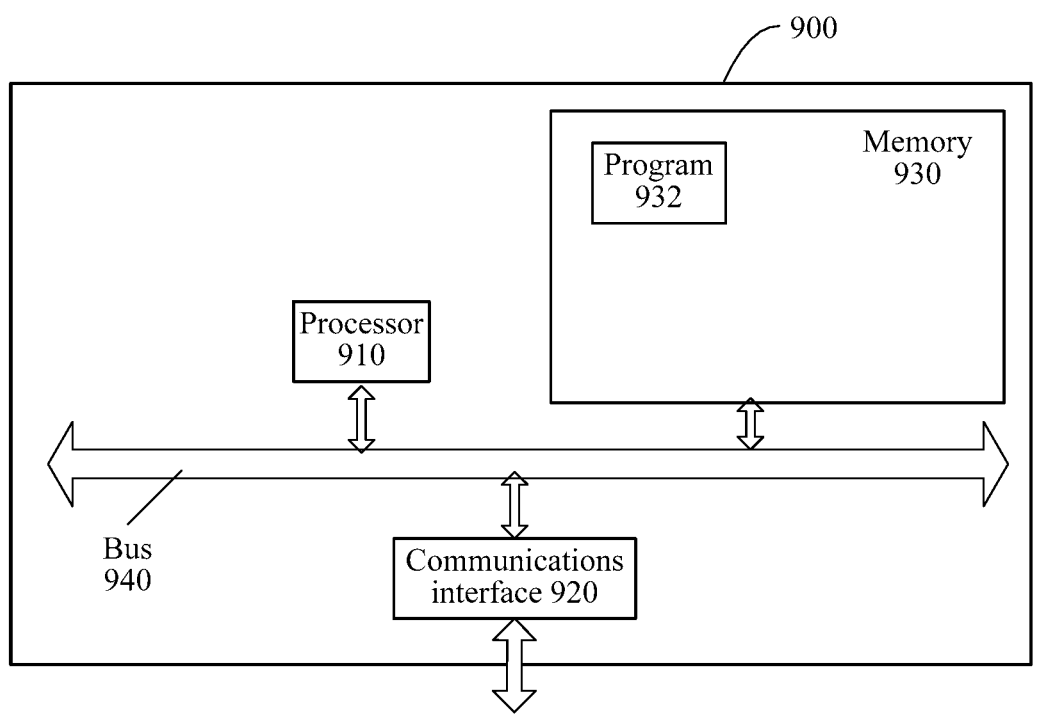
FIG. 9 is an example structural block diagram of a wireless communication apparatus according to an embodiment of the subject application.

FIG. 9 is a schematic structural diagram of a wireless communication apparatus 900 provided in an embodiment of the subject application, and the specific implementation of the wireless communication apparatus 900 is not limited in the specific implementation of the subject application. As shown in FIG. 9, the wireless communication apparatus 900 may comprise:

A processor 910, a communications interface 920, a memory 930, and a communications bus 940, where:

The processor 910, the communications interface 920, and the memory 930 complete mutual communications with each other through the communications bus 940.

The communications interface 920 is configured to communicate with a network element such as a client.

The processor 910 is configured to execute a program 932, and specifically can implement related functions of the wireless communication apparatus in, for example, embodiments of FIGS. 3-7.

Specifically, the program 932 may comprise a program code. The program code comprises a computer operating instruction.

The processor 910 may be a central processing unit CPU or an Application Specific Integrated Circuit (ASIC), or be configured to be one or more integrated circuits configured to implement the embodiments of the subject application. The program 932 may cause the wireless communication apparatus 900 to execute the following steps:

generating a wireless communication configuration parameter according to information associated with a wired connection of a first device and a wireless communication specification for the wireless communication to be performed by the first device; and in response to the disconnection of the wired connection, performing wireless communication with the first device according to the wireless communication configuration parameter.

Specific implementations of all steps in the program 932 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

It can be clearly understood by persons skilled in the art that, for the purpose of convenient and brief description, for a detailed working process of the described devices and modules, reference may be made to the corresponding descriptions in the foregoing apparatus embodiment, and the details will not be described herein again.

Although the theme described herein is provided in a general context executed in combination with the operating system and execution of an application on a computer system, a person skilled in the art may know that other implementations may also be executed in combination with other types of program modules. Generally speaking, the program module comprises a routine, a program, a component, a data structure and other types of structures used to execute a specific task or implement a specific abstract data type. A person skilled in the art may understand that, the theme described herein may be implemented by using another computer system configuration, comprising a handheld device, a multi-processor system, a micro-processor based or programmable consumer electronic product, a small-size computer, a large-size computer, and the like, and may also be used in a distributed computing environment in which a task is executed by using remote processing devices connection through a communications network. In the distributed computing environment, the program module may be located in storage devices of both a local memory and a remote memory.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the subject application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the subject application. The computer readable storage medium comprises a physically volatile and non-volatile, mobile, and non-mobile medium that is implemented by any manner or technology for storing information such as a computer readable instruction, a data structure, a program module, or other data. The computer readable storage medium specifically comprises, but is not limited to, a USB disk, a mobile hard disk, a Read-Only Memory (ROM), a Random Access Memory (RAM), an Erasable Programmable Read-Only Memory (EPROM), an electrically Erasable Programmable Read-Only Memory (EEPROM), a flash memory or another solid-state memory technology, a CD-ROM, a digital versatile disc (DVD), an HD-DVD, a Blue-Ray or another optical storage device, a magnetic tape, a magnetic disk storage or another magnetic storage device, or any other medium that can be used to store required information and can be accessed by the computer.

The aforementioned description of the implementation manners are merely provided for describing the subject application, but not intended to limit the subject application. Persons of ordinary skills in the art can also make many variations and changes without departing from the spirit and the scope of the subject application. Therefore, all the equivalent technical solutions also fall within the scope of the subject application, and the patent protection scope of the subject application shall be limited by the claims.

What is claimed is:

1. A wireless communication method implemented by a system comprising a processor, comprising:
   determining information associated with a wired connection between a first device and a second device;
   determining a rule of generating a wireless communication configuration parameter according to the information associated with the wired connection and a wireless communication specification associated with a wireless communication to be performed by the first device and the second device; and
   generating the wireless communication configuration parameter based on the rule in response to a disconnection of the wired connection,
   wherein the wireless communication configuration parameter enables the first and second devices to perform the wireless communication according to the wireless communication configuration parameter after the disconnection of the wired connection.

2. The method of claim 1, wherein the determining a rule of generating the wireless communication configuration parameter according to the information associated with the wired connection and the wireless communication specification comprises:
   determining the rule based on communications between the first device and the second device over the wired connection.

3. The method of claim 1, further comprising:
   sending the wireless communication configuration parameter.

4. The method of claim 1, wherein the wireless communication specification comprises at least one of the followings: WiFi, Bluetooth, Bluetooth Low Energy (BLE), Zig-bee, and Near Field Communication (NFC).

5. The method of claim 1, wherein the information associated with the wired connection comprises at least one of the followings: identification information of the first device and the second device, a data transmission rate/amount within the duration of the wired connection for a preset time period, information associated with transmitted data within the duration of the wired connection, a disconnection time of the wired connection, and a duration time of the wired connection.

6. A wireless communication method implemented by a system comprising a processor, comprising:
   determining a rule of generating a wireless communication configuration parameter according to information associated with a wired connection with a first device and a wireless communication specification associated with a wireless communication to be performed with the first device;
   generating the wireless communication configuration parameter based on the rule in response to a disconnection of the wired connection; and
   responsive to the disconnection of the wired connection, performing the wireless communication with the first device according to the wireless communication configuration parameter.

7. The method of claim 6, wherein the determining a rule of determining the wireless communication configuration parameter according to the information associated with the wired connection and the wireless communication specification of the first device comprises:
   determining the rule during the communications with the first device in a wired connection manner.

8. The method of claim 6, wherein the wireless communication specification comprises any one of the followings: WiFi, Bluetooth, Bluetooth Low Energy (BLE), Zig-bee, and Near Field Communication (NFC).

9. The method of claim 6, wherein the information associated with the wired connection comprises at least one of the followings: identification information of the first device and the second device, a data transmission rate/amount within the duration of the wired connection for a preset time period, information associated with transmitted data within the duration of the wired connection, a disconnection time of the wired connection, and a duration time of the wired connection.

10. A wireless communication apparatus, comprising:
    a processor, coupled to a memory, that executes or facilitates execution of executable modules, the executable modules comprising:
    a first determining module, configured to determine information associated with a wired connection between a first device and a second device;
    a second determining module, configured to determine a rule of generating a wireless communication configuration parameter according to the information associated with the wired connection and a wireless communication specification associated with a wireless communication to be performed by the first device and the second device; and
    a generating module, configured to generate the wireless communication configuration parameter based on the rule in response to a disconnection of the wired connection,
    wherein the wireless communication configuration parameter enables the first and second devices to perform the wireless communication according to the wireless communication configuration parameter after the disconnection of the wired connection.

11. The apparatus of claim 10, wherein the second determining module is configured to determine the rule during the communications between the first device and the second device in a wired connection manner.

12. The apparatus according to claim 10, further comprising:
    a sending module, configured to send the wireless communication configuration parameter.

13. A wireless communication apparatus, comprising:
    a processor, coupled to a memory, that executes or facilitates execution of executable modules, the executable modules comprising:
    a determining module, configured to determine a rule of generating a wireless communication configuration parameter according to the information associated with the wired connection and the wireless communication specification;

a generating module, configured to generate the wireless communication configuration parameter based on the rule in response to a disconnection of the wired connection; and a wireless communication module, configured to: responsive to the disconnection of wired connection is disconnected, perform the wireless communication with the first device according to the wireless communication configuration parameter.

14. The apparatus of claim 13, wherein the determining module is configured to determine the rule during the communications with the first device in a wired connection manner.

15. A non-transitory computer readable medium, comprising at least one executable instruction that, when executed by a system comprising a processor, causes the system to perform operations, comprising:
   determining information associated with a wired connection between a first device and a second device;
   determining a rule of generating a wireless communication configuration parameter according to the information associated with the wired connection and a wireless communication specification associated with a wireless communication to be performed by the first device and the second device; and
   generating the wireless communication configuration parameter based on the rule in response to a disconnection of the wired connection,
   wherein the wireless communication configuration parameter enables the first and second devices to perform the wireless communication according to the wireless communication configuration parameter after the disconnection of the wired connection.

16. A device for wireless communication, comprising a processor and a memory, wherein the memory stores a computer executable instruction; wherein the processor is connected with the memory via a communication bus and executes or facilitates execution of the executable instructions stored by the memory to cause the device to perform operations, comprising:
   determining information associated with a wired connection between a first device and a second device;
   determining a rule of generating a wireless communication configuration parameter according to the information associated with the wired connection and a wireless communication specification associated with a wireless communication to be performed by the first device and the second device; and
   generating the wireless communication configuration parameter based on the rule in response to a disconnection of the wired connection,
   wherein the wireless communication configuration parameter enables the first and second devices to perform the wireless communication according to the wireless communication configuration parameter after the disconnection of the wired connection.

17. A non-transitory computer readable medium, comprising at least one executable instruction which, when executed by a system comprising a processor, causes the system to perform operations, comprising:
   determining a rule of generating a wireless communication configuration parameter according to information associated with a wired connection with a first device and a wireless communication specification associated with a wireless communication to be performed with the first device;
   generating the wireless communication configuration parameter based on the rule in response to a disconnection of the wired connection; and
   responsive to the disconnection of the wired connection, performing the wireless communication with the first device according to the wireless communication configuration parameter.

18. A device for wireless communication, comprising a processor and a memory, wherein the memory stores a computer executable instruction; wherein the processor is connected with the memory via a communication bus and executes or facilitates execution of the executable instructions stored by the memory to cause the device to perform operations, comprising:
   determining a rule of generating a wireless communication configuration parameter according to information associated with a wired connection with a first device and a wireless communication specification associated with a wireless communication to be performed with the first device;
   generating the wireless communication configuration parameter based on the rule in response to a disconnection of the wired connection; and
   responsive to the disconnection of the wired connection, performing the wireless communication with the first device according to the wireless communication configuration parameter.

* * * * *